United States Patent [19]

Groepper

[11] 4,334,043

[45] Jun. 8, 1982

[54] METALLIC SALT PRE-TREATMENT OF CROSSLINKABLE CO-POLYMERS FOR ELIMINATING TACKINESS

[75] Inventor: Jürgen Groepper, Günzburg, Fed. Rep. of Germany

[73] Assignee: Pennwalt Corporation, Philadelphia, Pa.

[21] Appl. No.: 176,170

[22] Filed: Aug. 7, 1980

[30] Foreign Application Priority Data

Sep. 12, 1979 [DE] Fed. Rep. of Germany ....... 2936906

[51] Int. Cl.$^3$ ............................ C08F 8/42; C08F 8/44; C08F 8/46
[52] U.S. Cl. ..................................... 525/370; 525/245; 525/301; 525/360; 525/361; 525/362; 525/364; 525/371
[58] Field of Search ............... 525/370, 371, 361, 245, 525/301, 360, 362, 364; 260/23.7 M

[56] References Cited

U.S. PATENT DOCUMENTS

| | | | |
|---|---|---|---|
| 3,463,767 | 8/1969 | Bush et al. | 525/370 |
| 3,476,532 | 11/1969 | Hartman | 525/370 |
| 3,488,316 | 1/1970 | Flavel et al. | 525/370 |
| 3,855,194 | 12/1974 | Conard | 525/370 |
| 4,230,836 | 10/1980 | Canterino | 525/370 |
| 4,248,987 | 2/1981 | Maeda et al. | 525/370 |

FOREIGN PATENT DOCUMENTS 40-12173  6/1965  Japan ................................ 525/370

Primary Examiner—William F. Hamrock

[57] ABSTRACT

Crosslinkable polymers and co-polymers are treated with organo-metallic compounds, inorganic metallic salts, or lanthanides prior to crosslinking with free radical organic peroxide initiators in the presence of oxygen. This pre-treatment eliminates tackiness of the surface of the crosslinked polymer making the crosslinked polymer more commercially acceptable.

7 Claims, No Drawings

METALLIC SALT PRE-TREATMENT OF CROSSLINKABLE CO-POLYMERS FOR ELIMINATING TACKINESS

BACKGROUND OF THE INVENTION

The present invention relates to a method of pretreating crosslinkable polymers and co-polymers with organo-metallic compounds, inorganic metallic salts or lanthanides prior to crosslinking by free radical initiators using ultra-high frequency radiation (UHF) or hot air heating systems to form crosslinked polymers with non-tacky surfaces.

Prior to the present invention, crosslinked polymers and co-polymers using organic peroxide initiators have been produced in a molten bath known as liquid curing medium (LCM), in a steam pipe, or in other closed systems. For thick and complicated profiles, the UHF beams combined with hot air heating has been used for crosslinking the polymers. The descriptions in technical literature indicate that crosslinking is being carried out by sulfur employing the UHF hot air curing method and that crosslinking with organic peroxides results in incomplete crosslinked and tacky surfaces of the articles. (e.g., see Farkenfabriken Bayer, specification dated Mar. 2, 1962, Levapren 450 (ethylene-vinylacetate), paragraph 7.1.1 to 7.1.5 as well as specification dated Dec. 1, 1965, Urepan (urethane rubber), page 15, paragraph 1 and Chemische Werke Hüls May, 1976, 3rd edition, Buna AP (EPM/EPDM) operational procedure "processing description," page 4.) Tackiness is more pronounced with highly filled and oil extended co-polymers like ethylene-propylene co-polymer (EPM), ethylene-propylene-dienemonomer co-polymer (EPDM), styrene-butadiene rubber (SBR), acrylonitrile-butadiene rubber (NBR), natural rubber (Cis-1,4-polyisoprene) (NR), isoprene rubber (IR), ethylene-vinylacetate co-polymer (EVA), acrylnitrile-butadiene-styrene co-polymer (ABS), styrene-butadiene-styrene rubber (SBS), styrene-isoprene-styrene co-polymer (SIS), chloroprene rubber (CR), chlorinated polyethylene (CM) and polymethylene rubber. The present invention overcomes the problem of the tackiness of the surfaces of crosslinked polymers by the treatment of the crosslinkable polymers, copolymers or the shaped articles thereof prior to the crosslinking of such polymers with the free radical initiators even in the presence of oxygen.

STATEMENT OF INVENTION

The present invention is directed to a process for the crosslinking of crosslinkable polymers or co-polymers with free radical initiators in the presence of oxygen wherein the crosslinked polymer product normally has a tacky surface. This invention resides in the improvement wherein the crosslinkable polymers or co-polymers are pre-treated prior to crosslinking to prevent the surface tackiness with a member selected from the group consisting of an organo-metallic compound prepared by reacting an aliphatic or aromatic acid with transition element, an inorganic acid salt of a transition element, a lanthanides compound or mixture thereof; the transition elements are selected from the Periodic Table having an atomic number in the ranges of 21–30, 39–48, 57–80 and 89–92.

DETAILED DESCRIPTION OF INVENTION

It has now been found that the pre-treatment of crosslinkable polymers, co-polymers, or the molded articles thereof with inorganic metal salts, organo-metallic compounds of aliphatic or aromatic acids and transition elements (i.e., elements of the atomic numbers 21–30, 39–48, 57–80 and 89–92), lanthanide compounds or mixtures thereof, leads to cured products with non-tacky surfaces, even in the presence of oxygen. Examples of the transition metals and lanthanides are cobalt, manganese, iron, nickel, zirconium, chromium and cerium.

The invention relates to crosslinking of polymers and co-polymers with free radical initiators, such as organic peroxides, ultra high frequency radiation (UHF)—and/or hot air heating system to form shaped articles with tack-free surfaces.

In the past, peroxidic crosslinkable co-polymer profiles have been produced in a molten salt bath (LCM=liquid curing method), in a steam pipe or in other closed systems. Crosslinking by employment of UHF beams combined with hot air heating, above all for thick and complicated profiles, is practiced more and more. Description in technical literature indicates that crosslinking is being carried out by sulfur employing the UHF hot air curing method pointing out that crosslinking with organic peroxide results in incompletely crosslinked and tacky surfaces of the articles (compare for example Farbenfabriken Bayer, specification dated Mar. 2, 1962 Levapren 450 (ethylene-vinylacetate), paragraph 7.1.1 to 7.1.5 as well as specification dated Dec. 1, 1965 Urepan (urethane rubber), page 15, paragraph 1 and Chemische Werke Hüls May 1967, 3rd edition, Buna AP (EPM/EPDM) operational procedure "processing prescription", page 4.) Tackiness is more pronounced with highly filled and oil-extended co-polymers like EPM, EPDM, SBR, NBR, NR, IR, EVA, ABS, SBS, SIS, CR, CM and polymethylene rubbers.

It has been found that the treatment of crosslinkable polymers and co-polymers, or the molded articles thereof containing the radical initiators, such as organic peroxides, prior to the crosslinking process with inorganic metal salts or organo-metallic compounds of aliphatic or aromatic acids and transition elements (i.e., elements of the atomic numbers 21–30, 39–48, 57–80, and 89–92) and the lanthanides or mixtures thereof, leads to cured products with tack-free surfaces, even in the presence of oxygen.

Examples for the above mentioned suitable metals are: cobalt, manganese, iron, nickel zirconium, chromium and cerium.

Preferred transition metals are: cobalt, manganese, iron, nickel, cerium.

The suitable transition metals can be applied, for example, in the form of acetates, adipates, sebacates, palmitates, stearates, in the form of salts of highly branched, saturated mon-carboxylic acids of 9–11 carbon atoms, octoates, oleates, linoleates, ricinoleates, linolenates, triricinoleates, naphthenates, benzoates, dialkylphosphates and phosphites. Preferred are octoates and naphthenates.

The following are examples of suitable inorganic anions: chlorides, sulfates, nitrates, carbonates, phosphates. Inorganic salts are iron(III)chloride, chromium(III)chloride, cobalt(II) chloride, cobalt(III) chloride, cobalt(II)bromide, cobalt(III) bromide.

The preferred organo-metallic compounds are as follows:
1. cobalt stearate, -palmitate, -neodecanoate, -octoate, -oleate, -linoleate, -ricinoleate, -linolenate, -triricinoleate, -naphthenate, -benzoate;
2. Manganese stearate, -palmitate, -neodecanoate, -octoate, -oleate, -linoleate, -naphthenate;
3. Iron stearate, -palmitate, -octoate, -oleate, -adipate, -sebacate;
4. Nickel stearate, -octoate, -naphthenate, -neodecanoate, -oleate, -linolenate, -ricinoleate;
5. Cerium stearate, -octoate, -naphthenate, -neodecanoate, -oleate, -linolenate, -ricinoleate.

The organo-metallic compounds are used as molten liquids, or in solution with a metal content of 1–25% by weight.

For solvents, organic liquids can be used such as hydrocarbons, aromatics, chlorinated hydrocarbons, ketones, alcohols and oils. Examples are: acetone, xylene, toluene, cyclohexane, hexane, trichloroethane, propanol, hexylene glycol and ethyl acetate. Emulsions and suspensions in water and oil or other organic liquids can also be used.

High percentage (1–50%, preferably 5–25%) solutions, emulsions or suspension of inorganic salts of transition elements and/or of the lanthanides can also be used. Although difficulties may occur in wetting the surface of the molded parts using aqueous solutions or suspensions, wetting of the surfaces can be improved by using detergents such as alkylphenyl-polyethylene glycol ether, Na- and K-laurates or benzene sulfonates, and other auxiliary agents such as gelatin, α-methylcellulose, polyvinylalcohol, and/or other surfactants, suitable to improve the surface wetting properties of the inorganic salts.

All filled or unfilled polymers and co-polymers crosslinked by suitable free radical sources can be treated with the above mentioned metal combinations to achieve non-tacky surfaces. Polymers and co-polymers based on α-olefins are especially suited to this treatment to prevent tacky surfaces after curing. Examples of co-polymers which may be highly filled and oil extended are:

| | |
|---|---|
| EPM | Ethylene-propylene co-polymers |
| EPDM | Ethylene-propylene-dienemonomer co-polymers (for example, as dienemonomers are suitable: ethylene-norbornene, cyclopentadiene, butadiene, and others) |
| SBR | Styrene-butadiene-rubber |
| NBR | Acrylonitrile-butadiene rubber |
| NR | Natural rubber (Cis-1,4-polyisoprene) |
| IR | Isoprene rubber |
| EVA | Ethylene-vinylacetate co-polymers |
| ABS | Acrylnitrile-butadiene-styrene co-polymers |
| SBS | Styrene-butadiene-styrene rubber |
| SIS | Styrene-isoprene-styrene co-polymers |
| CR | Chloroprene rubber |
| CM | Chlorinated polyethylene, AU polyurethane rubber |
| HDPE | High density polyethylene |
| LDPE | Low density polyethylene |
| Polymethylene rubber | |

The metal salts or organo-metallic compounds are applied on the polymers or co-polymers which could be premolded parts by dipping or spraying. The organo-metallic compounds are applied pure, as molten liquids, solutions, emulsions or suspensions as mentioned before.

With this treatment, 0.1 g to 25 g of metal per $m^2$, usually 0.5 g to 5 g of metal per $m^2$, are spread on the surface. For example: This leads to a consumption of 8 to 80 g per $m^2$ of an organo-metallic solution in xylene containing 6% by weight of the metal.

The metal salts and organo-metallic compounds can also be added directly to the polymer compounds at amounts of 0.1 to 10% of weight, preferably 2 to 5% of weight, relative to pure metal soaps or inorganic salts.

The batches are generally composed of polymers and/or co-polymers with different customary additives such as reinforcing materials and fillers like carbon black, metaloxides, clay, pigments, silicates, as well as radical initiators, activators, co-agents, antioxidants, plasticizers, oils, and/or extender oils.

The free radical initiators, such as organic peroxides, azo compounds and C—C initiators, are added to the crosslinking process in the range of 0.5 to 15% by weight, generally 1 to 10% weight. Co-agents, such as triallylcyanurate, triallylphosphate, ethylene glycol dimethacrylate, trimethylolpropanetrimethacrylate, divinyl benzene, diallylmaleate, can also be applied in amounts of 0 to 5% by weight, usually 0.5 to 3% by weight related to the finished polymer batch.

Tacky surfaces obtained with the usual crosslinking of polymers and/or co-polymers in air can be avoided by the novel procedure herein disclosed.

This is demonstrated by the following examples:

EXAMPLE I

In order to demonstrate the claimed improvement, batches were used according to a known standard recipe which gives extremely high surface tackiness consisting of:

100 parts EPDM containing a dienemonomer of an ethylidenenorbornene type and with a mooney scorch NL 1+4 (100° C.)=65
90 parts of HAF carbon black
60 parts of a high boiling hydrocarbon oil
4 parts of dicumylperoxide 98%

This batch was produced on a two roll mill and rolled out to a 4 mm sheet. From this sheet 20×30 mm thick pieces were punched out. These punched samples were cured in an oven with forced air heating at 230° C. for 5 minutes (at this temperature 5 minutes were sufficient to achieve a 99% decomposition of the peroxide or curing). The samples were either untreated, or treated with the above described organo-metallic compounds or inorganic salts before the curing process. The crosslinked hot samples were then pressed with constant force and time on a sheet of paper. A more or less intense black and sticky print remained after removal of the sample from the paper.

The samples pre-treated with the metallic compounds left no or much less intense prints on the paper than the untreated samples.

The following table shows the efficiency of the individual compounds in comparison with the untreated samples:

TABLE I

| Example No. | Formulations | Treatment | Intensity of Prints |
|---|---|---|---|
| 1 | untreated sample | — | +++ |
| 2 | cobalt-octoate solution, 6% cobalt in xylene | spray-up | — — — |
| 3 | manganese-octoate solu- | spray-up | — — — |

TABLE I-continued

| Example No. | Formulations | Treatment | Intensity of Prints |
|---|---|---|---|
| | tion, 6% manganese in xylene | | |
| 4 | zirconium-octoate solution, 6% zirconium in xylene | spray-up | −++ |
| 5 | iron-octoate solution, 6% iron in xylene | coated | −−− |
| 6 | FeCl₃ (22% solution in acetone and H₂O (1:1)) | coated | −−+ |
| 7 | zirconium-iron-octoate solution 5.4% zirconium, 0.6% iron content in xylene | spray-up | −−− |
| 8 | Co(III) acetate 20% solution in H₂O | coated | −++ |
| 9 | CrCl₃ 20% solution in H₂O-acetone 1:1 | coated | −++ |
| 10 | FeCl₃ 20% solution in acetone | coated | −−+ |
| 11 | Zr—Fe-octoate solution, 5.8% Zr, 0.2% Fe content in zylene | spray-up | −−+ |
| 12 | Ni-octoate solution, 7.5% metal content in xylene | spray-up | −−− |
| 13 | Ce - octoate solution, 6% metal content in xylene | coated | −−− |
| 14 | Ce - octoate solution, 6% metal content in xylene | 2% of solution added on roll mill | −−+ |
| 15 | Ni-octoate, technical pure, 15% metal | 2% Ni-octoate added on roll mill | −−+ |

Explanation:
−−− = none
−−+ = weak
−++ = medium
+++ = very intense

EXAMPLE II 100 parts EVA (VAE 611 Wacker) containing 60% vinylacetate
20 parts of HAF carbon black
20 parts of dioctylphthalate
2 parts of dicumylperoxide 98%

This batch was produced and treated in the same way as described in Example I.

The punched samples were also cured in an oven with forced air heating at 230° C. for 8 minutes. The crosslinked hot samples were then pressed with constant force and time on a sheet of paper.

The samples pre-treated with metallic compounds left no or much less intensive prints on the paper than the untreated samples as shown in the following Table II:

TABLE II

| Example No. | Formulations | Treatment | Intensity of Prints |
|---|---|---|---|
| 1 | untreated sample | — | +++ |
| 2 | Ce-octoate solution, 6% metal content in xylene | coated | −−− |
| 3 | cobalt-octoate solution, 6% cobalt in paraffinic oil | coated | −−+ |
| 4 | cobalt-octoate solution, 6% cobalt in xylene | coated | −−− |
| 5 | iron-octoate solution, 6% iron in xylene | coated | −−− |
| 6 | zirconium-octoate solution, 6% zirconium in xylene | coated | −++ |
| 7 | zirconium-iron-octoate solution, 5% zirconium-, 1% iron-content in xylene | | −−− |

What is claimed is:

1. In a process for the crosslinking of crosslinkable polymers or co-polymers comprising molding the crosslinkable polymers or co-polymers into the desired shaped articles and crosslinking the shaped articles with free radical initiators of organic peroxides in the presence of oxygen wherein the crosslinked polymer or copolymer products have a tacky surface, the improvement comprising pretreating the shaped articles of crosslinkable polymers or copolymers prior to crosslinking by heating to prevent the surface of the shaped articles from being tacky with a member coated thereon selected from the group consisting of
   (a) an organo-metallic compound prepared by reacting an aliphatic or aromatic acid with a transition element,
   (b) inorganic acid salts of transition elements,
   (c) lanthanide compound, and
   (d) mixtures thereof wherein the transition elements are metals selected from the Periodic Table having an atomic number in the range of 21 to 30, 39 to 48, 57 to 80 and 89 to 92.

2. The process of claim 1 wherein the organo-metallic compound is used in the form of a salt of saturated or unsaturated aliphatic or aromatic mono- and dicarboxylic acid.

3. The process of claim 2 wherein the organo-metallic salt is a palmitate, stearate, neodecanoate, octoate, oleate, linoleate, ricinoleate, linolenate, triricinoleate, naphthenate, benzoate, acetate, adipate or sebacate.

4. The process of any of the claims 1 to 3 wherein the metal is selected from cobalt, manganese, iron, nickel, zirconium, chromium or cerium.

5. The process of any of the claims 1 to 4, wherein the polymer or co-polymer, which may contain the usual additives and fillers, is pretreated with the organo-metallic compound or metal salt by dipping, spraying or coating after being shaped into articles.

6. Process of any of the claims 1 to 4 wherein the organo-metallic compound or metal salt is mixed into the polymer or co-polymer which may contain the usual additives and fillers.

7. The process of claim 4 wherein the organo-metallic compound is an octoate.

* * * * *